United States Patent Office 3,162,617
Patented Dec. 22, 1964

3,162,617
POLYIMINE-POLYFUNCTIONAL AMINE
COPOLYMERS
George H. Smith, Ramsey, Minn., assignor to Minnesota Mining and Manufacturing Company, St. Paul, Minn., a corporation of Delaware
No Drawing. Filed Nov. 3, 1959, Ser. No. 850,541
15 Claims. (Cl. 260—77.5)

This invention relates to copolymeric compositions and more particularly to interpolymers of polyfunctional amines with certain polyfunctional alkylenimine derivatives.

It is an object of the present invention to provide a new and useful class of copolymeric resins.

It is another object of the present invention to provide a class of liquid and solid compositions which cure at relatively low temperatures (often at room temperature) without appreciable shrinkage to dense, tough, resinous or elastomeric solids.

It is another object of the present invention to provide a novel and useful class of protective coatings.

It is another object of the present invention to provide a class of liquid, solvent-free compositions which cure smoothly and at relatively low temperatures to dense, tough, chemically resistant resinous or elastomeric solids which have good electrical properties, and good resistance to high temperature and high humidity.

Still another object of this invention is to provide a method for preparing and curing the aforementioned curable compositions.

Additional objects will be apparent to those skilled in the art from reading the specification which follows.

In accordance with the above and other objects of the invention it has been found that when certain amine compounds are copolymerized with the hereinafter-defined polyfunctional alkylenimine derivatives, new resinous or elastomeric compositions are produced which have highly advantageous properties.

Amine compounds which are suitable for use in the present invention can be characterized generally as those organic amino compounds which contain at least two active, amine-attached hydrogen atoms per molecule, i.e., active hydrogen atoms bonded directly to amine nitrogen atoms. For convenience such amines will often be referred to herein as "polyfunctional amines." The presence of such active, amine-attached hydrogen atoms may be determined by the well known Tschugaeff-Zerewitinoff analytical technique, e.g., note J.A.C.S., 49, 2181 (1927).

The polyfunctional alkylenimine derivatives employed in preparing the copolymers of the invention are poly-1,2-alkylene carbamates in which the alkylene group contains from 2 to about 10, preferably from 2 to 6, carbon atoms. These compounds contain at least two alkylenimine rings and may have three or more of such rings. Thus, a bis-1,2-alkylene carbamate is derived from a dihydroxy glycol, such as 1,4-butane diol, and a tris-1,2-alkylene carbamate is derived from a trihydroxy glycol, such as Dow Polyglycol 15–200 as hereinafter described. These poly-1,2-alkylene carbamates have the formula

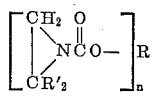

wherein R' represents hydrogen or a lower alkyl group, e.g., having from 1 to 4 carbon atoms, R is an *n*-valent organic radical, including an aliphatic, aromatic or alicyclic radical, and *n* is an integer greater than 1, preferably 2 or 3.

The preferred poly-1,2-alkylene carbamates are N,N'-bis-1,2-alkylene carbamates represented by the formula

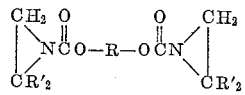

wherein R' represents hydrogen or a lower alkyl group, e.g., having from 1 to about 4 carbon atoms, and R is a divalent aliphatic, aromatic or alicyclic radical. R may contain atoms other than carbon, such as oxygen, sulfur, etc. For convenience the poly-1,2-alkylene carbamates will frequently be hereinafter illustrated in terms of the "bis-1,2-alkylene carbamates" or "bis-carbamates."

The copolymers of the invention form valuable protective coatings for common materials of construction such as, for example, wood, glass, fabric and metals. They are generally strongly adherent to such surfaces and are inert with respect to them. They can ordinarily be employed for coatings without solvents from 100 percent solids-forming liquid systems. When cured they form clear, tough, transparent or translucent coatings. These coatings retain desirable properties at high temperatures and have excellent resistance to weathering, to water and to high humidity.

In spite of their general utility as protective coatings, the copolymer compositions of the invention vary widely in their intermediate and ultimate properties. These property variations, in addition to indicating preferences for certain subgroups of the copolymers within the invention for particular protective coating applications, also render certain of the copolymers extremely valuable in applications other than protective coatings in which other subgroups are less useful.

Basic among the intermediate properties of the copolymers of the invention, with respect to determining the suitability of a particular copolymer for a particular application, is reactivity. Reactivity is often discussed separately as pot life, amount and controllability of exotherm, curing time and temperature, etc. These characteristics are, however, all manifestations of reactivity and are so recognized.

In the present invention, it has been found that the reactivity of a given polyfunctional amine toward the poly-1,2-alkylene carbamates generally can be characterized in terms of a combination of the nature of the reactive amine groups present (i.e., whether aliphatic, aromatic or alicyclic, the aliphatic amines being much more strongly basic and reactive than the aromatic amines and the alicyclic amines being of intermediate basicity and reactivity), and the concentration of the amine groups, which may, as known to the art, be expressed as the amine value. It has also been found that the reactivity of a given poly-1,2-alkylene carbamate toward the polyfunctional amines can be generally described in terms of a combination of structural features. A particularly important structural feature in this regard is the presence or absence of a lower alkyl substituent group carried by a carbon atom of each aziridine or ethylenimine ring. Those carbamates having such groups, which will sometimes be referred to herein for convenience as the higher carbamates, are much less reactive than those not having such substituent groups. A second important structural feature in determining the reactivity of the poly-1,2-alkylene-carbamates is equivalent weight. The equivalent weight of these carbamates is determined by dividing their molecular weight by their functionality, each aziridine ring contributing one function.

In addition to the factors noted, the reactivity of any copolymer system of the invention depends upon such other factors as the physical state (solid or liquid) or the constituents, their viscosities, the presence of additives such as solvents, fillers, other resins, etc. The effect of these factors is similar to what is observed in polymer systems known to the art.

It is ordinarily preferred to use approximately stoichiometric amounts of the polyfunctional amine and the poly-1,2-alkylene carbamate comonomers in preparing the copolymers of the invention, although the system is rather insensitive to departure from stoichiometric amounts. Maximum tensile properties are ordinarily achieved with stoichiometric equivalents, while softer, more flexible, more slowly curing copolymers are usually obtained when an excess of the polyfunctional amine is added. An excess of the carbamate constituent may be expected to result in a harder copolymer having both lower tensile strength and lower elongation. In particular product applications it may be desirable to depart from stoichiometrically equivalent amounts and such departures are contemplated in the present invention.

Although certain of the polyfunctional amines and poly-1,2-alkylene carbamates tend to polymerize or cure at room temperature, the reaction is often relatively slow and heating to an elevated temperature, usually below about 200° C., e.g., about 50° C. to about 180° C., considerably increases the rate of reaction without unduly affecting color and without undesirable bubbling.

I. THE POLYFUNCTIONAL AMINES

Among the aliphatic polyfunctional amines useful as comonomers in the present invention are the polyalkylene polyamines such as ethylene diamine, diethylene triamine, triethylene tetramine, tetraethylene pentamine, trimethylene diamine, tetramethylene diamine, pentamethylene diamine, hexamethylene diamine, asymmetrical N-dimethyl propylene diamine, 1,3-pentamethyl diethylene triamine and asymmetrical N-diethyl propylene diamine 1,3; ethylene oxide-amine adducts such as monohydroxy diethylene triamine and bis-hydroxyethyl diethylene triamine; propylene oxide-amine adducts such as N-(2-hydroxypropyl) ethylene diamine; etc. It is, in fact, sometimes desirable to modify their reactivity in order to avoid too rapid reaction with certain of the poly-1,2-alkylene carbamates. Such modification can be accomplished in a variety of ways, such as, for example, bringing the reactants together in a solvent system, using fillers with the system, preventing the build-up of heat by increasing the surface-to-volume ratio immediately after mixing the constituents and before substantial interreaction has taken place, for example, by coating the newly formed mixture as a thin film, and the like.

Differing from the polyalkylene polyamines, for the purposes of the present invention, primarily in that they have generally lower amine values, are the various polyfunctional aliphatic amines which are derived from low polymers of unsaturated fatty acids. It appears that polymerization of the unsaturated fatty acids takes place by inter-molecular condensation at the double bonds. The resulting low polymers generally comprise dimers and trimers, although tetramers or higher polymers can also be formed. Although, these polymers have extremely complex structures which are not known with particularly, postulated structures of the dimer and the trimer of linoleic acid, which indicate possible structures of these low polymers in general, are as follows:

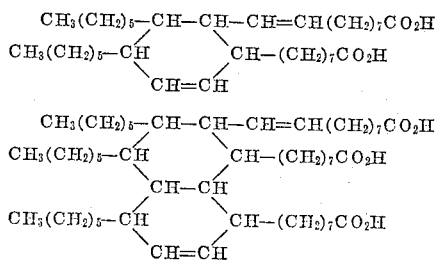

The preparation of such polymeric polyene fatty acids is described in United States Patents 2,482,761, 2,373,015 and 2,435,478.

The low molecular weight polymers of polyene fatty acids can be reacted with polyfunctional amines to form higher molecular weight materials which contain aliphatic amine and amide functional groups. A postulated structure for a product of this type (the reaction product of the dimer of linoleic acid and ethylene diamine) is as follows:

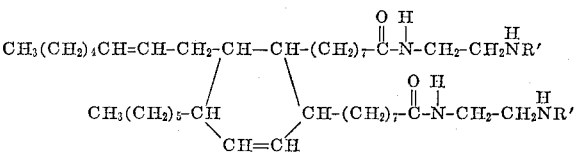

wherein R' is hydrogen or another linoleic acid dimer group. When a dimer of a fatty acid, e.g., of linoleic acid, is condensed with a diamine, solid, thermoplastic materials usually result while if a polyamine is used in place of the diamine, soft or liquid materials usually result. Resins of this general type are disclosed in United States Patent 2,450,940. Amine-terminated polyamides of this type, which will sometimes be referred to hereinafter for convenience simply as polyfunctional amines, are available from General Mills, Inc. of Kankakee, Illinois, under the registered trademark "Versamid." Among these products, which are produced by the condensation of polycarboxylic acids with polyamines, are "Versamid" 100, a soft, tacky resin that is semisolid at room temperature, which melts at 43–53° C. and which has an amine value of 83–93; "Versamid" 115, a viscous liquid resin at room temperature which has a viscosity at 40° C. of approximately 500–750 poises (on a Brookfield Viscometer using a No. 6 Spindle and revolving at 4 r.p.m.) and an amine value of 210–230; "Versamid" 125, a fluid resin at room temperature which is reported to have a viscosity at 40° C. of approximately 80–120 poises (on a Brookfield Viscometer using a No. 6 Spindle and revolving at 4 r.p.m.) and an amine value of 290–320; and "Versamid" XD–140, derived dimeric polyene higher fatty acids of the type described hereinabove, which is a liquid at room temperature which has a viscosity at 25° C. of approximately 130±30 poises (on a Brookfield Viscometer using a No. 6 Spindle and revolving at 4 r.p.m.) and an amine value of approximately 325–360.

Aliphatic polyfunctional amines which contain no amide groups may be prepared from the polymerized polyene fatty acids, for example, by dehydration of the ammonium salt of the acid followed by hydrogenation of the resulting amide, during which the residual unsaturation may be partly or wholly removed. A postulated structure for a product of this reaction is exemplified by the following:

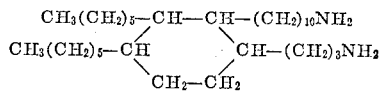

Polyfunctional amines of this type, which can be obtained from Emery Industries, Inc. of Cincinnati, Ohio, are "Emery 3154-R" amine, a liquid resin at room temperature which has an amine value of approximately 177; and "Emery 654-27-R" amine, which is also liquid at room temperature and which has an amine value of approximately 155. These and the above amide group-containing polyfunctional amines can be designated generically as polyfunctional amines derived from low polymers of higher fatty acids.

The easily available aliphatic polyfunctional amines which contain relatively low concentrations of amine functional groups, e.g., the "Versamid" and "Emery Amine" products which are substantially liquid, that is, liquid or semi-solid at ordinary temperatures lend themselves to easy mixing with the polyfunctional alkylenimine derivatives, particularly when the latter are also liquids. Mixtures of the fatty acid amine polymers may be used if properties intermediate of two of them are desired, and in fact the commercially available products are themselves mixtures and commonly contain an amount of unpolymerized material, but this does not destroy their utility for use in the present invention.

Among the aromatic polyfunctional amines which are useful in preparing the copolymers of the invention are methylene-bis-o - chloroaniline, 4,4' - diamino diphenylsulfone, 4-isopropyl-m-phenylene-diamine, m-phenylene diamine, benzidine, and the liquid eutectic mixture of m-phenylene diamine with 4 - isopropyl - m - phenylene diamine (available commercially from the E. I. du Pont Company, amine value approximately 800–900), as well as 4,4'-methylene dianiline, 2,6-diamino pyridine, 4-chloro-o-phenylene diamine, N-(2-aminoethyl) pyridine, etc.

In addition the alicyclic polyfunctional amines, such as methane diamine and N-(2-aminoethyl) piperazine, and araliphatic polyfunctional amines such as m-xylylene diamine, are also useful in preparing the copolymers of the invention.

The primary amines which contain only one amine nitrogen per molecule but which are difunctional with respect to replaceable amine hydrogen atoms are also suitable for use in the present invention. Among these compounds, which are considered for purposes of the present invention to be polyfunctional amines are n-butyl amine, allyl amine, cyclohexyl amine, aniline, octadecylamine, benzylamine, chloroaniline, etc.

II. THE POLY-1,2-ALKYLENE CARBAMATES

The poly-1,2-alkylene carbamates are prepared in monomeric form by the following process: A 1,2-alkylenimine, desirably containing not more than 6 carbon atoms, such as ethylenimine, 1,2-propylenimine, 1,2-butylenimine, 1,2-pentylenimine, 1,2-hexylenimine, 1,1-dimethylethylenimine, etc., is reacted with a chlorocarbonate of a polyfunctional alcohol, for example, 1,4-butanediol-bischlorocarbonate, glycerin-tris-chlorocarbonate, diethylene glycol-bis-chlorocarbonate, triethylene glycol-bis-chlorocarbonate, polyethylene glycol-200-bis-chlorocarbonate, polyethylene glycol-400-bis-chlorocarbonate, polyethylene glycol-1000-bis-chlorocarbonate, polyethylene glycol-4000-bis-chlorocarbonate, polypropylene glycol-1025-bis-chlorocarbonate, polybutylene glycol-500-bis-chlorocarbonate, resorcinol bis-chlorocarbonate, 1,1'-isopropylidenebis (p-cyclohexanol)-bis-chlorocarbonate, 1,1'-isopropylidenebis (p-phenol)-bis-chlorocarbonate, 1,1'-isopropylidenebis (p-phenyleneoxy) di-2-propanol-bis-chlorocarbonate, 1,4-cyclohexanedimethanol bis chlorocarbonate, etc., to produce the desired substantially pure poly-1,2-alkylencarbamate monomer, with hydrogen chloride as a by-product. In naming the individual poly-1,2-alkylene carbamates herein the 1,2-alkylenimine portion thereof is first designated followed by the chlorocarbonate (i.e. polyfunctional alcohol) portion. Thus for example, N,N'-bis-1,2-butylene (polyethylene glycol-4000) carbamate would be the bis-carbamate reaction product of 1,2-butylenimine with polyethylene glycol-4000-bis-chlorocarbonate (which chlorocarbonate is itself prepared from polyethylene glycol-4000).

Illustrative of the bis-carbamates which are useful as comonomers in the present invention, listed with their equivalent weights (E.W.), are: N,N'-bis-1,2-ethylene (1,4-butanediol) carbamate (E.W. 114), N,N'-bis-1,2-propylene (1,4-butanediol) carbamate (E.W. 128), N,N'-bis-1,2-buetylene (1,4-butanediol) carbamate (E.W. 142), N,N'-bis-1,2-ethylene (diethylene glycol) carbamate (E.W. 122), N,N'-bis-1,2-butylene (diethylene glycol) carbamate (E.W. 150), N,N'-bis-1,2-ethylene (triethylene glycol) carbamate (E.W. 144), N,N'-bis-1,2-propylene (triethylene glycol) carbamate (E.W. 158), N,N'-bis-1,2-butylene (triethylene glycol) carbamate (E.W. 172), N,N'-bis-1,2-ethylene (polyethylene glycol-200) carbamate (E.W. 169), N,N'-bis-1,2-ethylene (polyethylene glycol-400) carbamate (E.W. 269), N,N'-bis-1,2-ethylene (polyethylene glycol-1000) carbamate (E.W. 597), N,N'-bis-1,2-propylene (polyethylene glycol-1000) carbamate (E.W. 611), N,N'-bis-1,2-ethylene (polyethylene glycol-4000) carbamate (E.W. 1400), N,N'-bis-1,2-ethylene (propylene glycol-1025) carbamate (E.W. 582), N,N'-bis-1,2-ethylene (polybutylene glycol-500) carbamate (E.W. 319), N,N'-bis-1,2-ethylene [1,1'-isopropylidenebis (p-cyclohexanol)] carbamate (E.W. 189), and N,N'-bis-1,2-ethylene [1,1'-isopropylidenebis (p-phenyleneoxy) di-2-propanol] carbamate (E.W. 241).

Among the tris-carbamates which are useful as comonomers in the present invention are N,N',N''-tris-1,2-ethylene (Dow Polyglycol 15–100) carbamate, N,N',N''-tris-1,2-ethylene (Dow Polyglycol 15–200) carbamate, etc. The structure of the polyglycols from which the above tris-carbamates are derived is set forth hereinafter in Examples F and G.

The 1,2-alkylenimine is added in a ratio of 2 moles for each mole of bis-chlorocarbonate, 3 moles for each mole of tris-chlorocarbonate, etc. Advantageously, an excess of 1,2-alkylenimine such as about 5% by weight, over and above this ratio may be employed, although an excess of up to about 25% may be added.

Desirably, the 1,2-alkylenimine is introduced into and at least partially dissolved in a concentrated aqueous solution of an ammonium or alkali-metal carbonate, such as sodium, potassium or lithium carbonate, which acts as an acid acceptor to neutralize the hydrogen chloride formed during the reaction of the process. When a higher 1,2-alkylenimine than ethylenimine, i.e., one containing more than 2 carbon atoms, is employed, an ammonium or alkali-metal bicarbonate, such as sodium, potassium, or lithium bicarbonate, may be used as the acid acceptor instead of a carbonate. This aqueous mixture is intimately mixed with the chlorocarbonate dissolved in a substantially water-immiscible organic solvent which is chemically inert to both the reactants and the reaction products and in which the resulting poly-1,2-alkylene carbamate product is soluble. This monomer reaction product is then recovered in a relatively pure, stable state in high yield from the organic solvent by evaporating the solvent in which it collects as the reaction proceeds. The intermediate bis-chlorocarbonates may be prepared by the reaction of phosgene with the appropriate polyfunctional alcohol at a temperature of below about 50° C. A process for the preparation of these intermediate compounds is disclosed in U.S. Patent 2,370,568.

It has been discovered that in producing a poly-1,2-ethylene carbamate from ethylenimine according to the invention, pH control of the reaction mixture is generally more critical than where alkylenimines containing more than 2 carbon atoms are employed. Thus in such cases it is often important to employ an ammonium or alkali-metal carbonate as the acid acceptor in an amount sufficient to neutralize all of the hydrochloric acid formed during the reaction of the process and yet maintain the pH of the reaction mixture at about 8.5 or above. With alkylenimines containing more than 2 carbon atoms, on the other hand, an ammonium or alkali-metal bicarbonate may be employed instead of the carbonate as the acid acceptor, so long as sufficient bicarbonate is present to neutralize all of the hydrochloric acid formed. This phenomenon is believed to be the consequence of the greater reactivity of ethylenimine derivatives when compared to those alkylenimine derivatives containing more than 2 carbon atoms.

The aqueous phase contains a high concentration of carbonate or bicarbonate, i.e., is substantially saturated with respect to the acid acceptor. This, together with the alkali metal chlorides formed by the reaction of the hydrogen chloride with the acid acceptor, blocks the dissolution of the poly-1,2-alkylene carbamate products in the aqueous phase, although they are generally appreciably water-soluble, and causes them to dissolve in the organic phase. The hydrogen chloride which is formed in reaction, on the other hand, is neutralized by the acid acceptor as it is formed. In this way the product and the hydrogen chloride are isolated from one another and any detrimental side reactions are obviated. A relatively small volume of aqueous phase is preferably used (e.g., half the volume of the organic phase) in order to reduce the total volume of the reaction and to reduce the amount of acid acceptor used. Regardless of the accuracy of this theory, the process produces stable, highly pure poly-1,2-alkylene carbamates in yields often exceeding 90% of theoretical and containing less than about 1% by weight of chlorine (as chloride ion).

Desirably, the process of producing these monomers is carried out at a temperature range from about −5° to +30° C. Although lower temperatures may be employed, there is no advantage in so doing, since this requires additional expensive refrigeration or other cooling equipment. At higher temperatures, loss of product due to hydrolysis and other side reactions is sometimes encountered.

Among the substantially water-insoluble organic solvents which may be employed are: carbon tetrachloride, chloroform, benzene, toluene, diethylether, trichloroethylene, etc. Toluene and benzene are the preferred solvents.

The requirements for the organic solvent to be used as the organic phase of this reaction are that it must be immiscible with the aqueous phase, be capable of dissolving a reasonable amount of the chlorocarbonate (such as about 10 to about 60 weight percent or higher before saturation at the temperature of reaction), and be more capable of selectively dissolving and containing the carbamate product than the aqueous phase. These solvents, particularly the preferred solvents, are excellent for storage of the products of this invention for extended periods of time. In case of storage, the solution should be as anhydrous as possible, such as can be obtained by drying the product solution with a molecular sieve or with calcium sulfate. The solvents should preferably have high volatility to facilitate separation of the product therefrom by distillation or evaporation. In general, the selection of the proper solvent for the particular product to be produced is best accomplished by simple trial and error, with the above requirements controlling.

Mixtures of the poly-1,2-alkylene carbamates may be produced by employing a mixture of reactants, such as mixed 1,2-alkylenimines or mixed chlorocarbonates or both.

Although any of the alkali-metal carbonates may be employed as acid acceptors in the process of the invention, sodium and potassium carbonates are preferred.

In order more clearly to disclose the preparation of the intermediate poly-1,2-alkylene carbamate compounds, specific examples of the preparation of several of them will now be described. All parts in these examples are by weight unless otherwise designated.

Example A

A 250 ml. three necked flask is equipped with a stirrer, thermometer, condenser, and dropping funnel. To the flask is added a solution of 41.5 g. (0.3 M) of potassium carbonate in 50 ml. of water, followed by 9.0 g. (0.21 M) of ethylenimine. This mixture is stirred and cooled to 10° C. A solution, composed of 21.5 g. (0.1 M) of 1,4-butanediol bis chlorocarbonate in 100 ml. of benzene, is then added dropwise to the flask with stirring and cooling over a period of about 22 minutes. The mixture is kept at 10–12° C. during the addition and is allowed to warm to room temperature after the addition has been completed. Stirring is continued for an additional hour. The benzene layer is recovered, dried over a molecular sieve (a product of the Linde Air Products Co.), filtered, and evaporated to constant weight under vacuum. 22.2 g. of a clear liquid product containing 11.8% nitrogen and 0.7% chlorine as compared to calculated theoretical values of 12.3% and 0.0% respectively, identified as N,N'-bis-1,2-ethylene (1,4-butanediol) carbamate are obtained, which corresponds to a 97% yield.

Example B

A 250 ml. three necked flask is equipped with a stirrer, thermometer, condenser and dropping funnel. To the flask is added a solution of 41.5 g. (0.3 M) of potassium carbonate in 50 ml. of water, followed by 9.0 g. (0.21 M) of ethylenimine. This mixture is stirred and cooled to 10° C. A solution composed of 27.5 g. (0.1 M) of triethylene glycol bis chlorocarbonate in 100 ml. of benzene is then added dropwise to the flask with stirring and cooling over a period of about 18 minutes. The mixture is kept at 10–12° C. during the addition and is allowed to warm to room temperature after the addition has been completed. Stirring is continued for an additional hour. The benzene layer is recovered, dried over a desiccant, filtered and evaporated to constant weight under vacuum. 28 g. of a water-white liquid product, identified as N,N'-bis-1,2-ethylene (triethylene glycol) carbamate, were obtained, corresponding to a 99% yield. Its refractive index ($n_D^{25}$) is 1.4748 and its density ($d_4^{22°}$) is 1.198. Upon analysis, this product is found to contain 9.74% nitrogen and 0.1% chlorine as compared to calculated values of 9.73% and 0.0% respectively.

Example C

A 250 ml. three necked flask is equipped with a stirrer, thermometer, condenser and dropping funnel. To the flask is added a solution of 41.5 g. (0.3 M) of potassium carbonate in 50 ml. of water, followed by 9.0 g. (0.21 M) of ethylenimine. The mixture is stirred and cooled to 10° C. A solution, composed of 32.5 g. (0.1 M) of polyethylene glycol-200-bis-chlorocarbonate in 100 ml. of benzene, is then added dropwise to the flask with stirring and cooling over a period of about 19 minutes. The mixture is kept at 10–12° C. during the addition and is allowed to warm to room temperature after the addition has been completed. Stirring is continued for an additional hour. The benzene layer is recovered, dried over a desiccant, filtered, and evaporated to constant weight under vacuum. 32.2 g. of a water-white liquid product, identified as N,N'-bis-1,2-ethylene (polyethylene glycol-200) carbamate, are obtained, corresponding to a 95% yield. Upon analysis, this product is found to contain 8.27% nitrogen and 0.1% chlorine as compared to calculated values of 8.29% and 0.0% respectively.

Example D

A 500 ml. three necked flask is equipped with a stirrer, thermometer, condenser and dropping funnel. To the flask is added a solution of 41.5 g. (0.3 M) of potassium carbonate in 50 ml. of water, followed by 4.1 g. of ethylenimine. This mixture is stirred and cooled to 10° C. A solution, composed of 50 g. (0.044 M) of polypropylene glycol-1025-bis-chlorocarbonate in 200 ml. of benzene, is then added dropwise to the flask with stirring and cooling over a period of about 45 minutes. The mixture is kept at 10–12° C. during the addition and is allowed to warm to room temperature after the addition has been completed. Stirring is continued for an additional hour. The benzene layer is recovered, dried over a desiccant, filtered, and evaporated to constant weight under vacuum. 49 g. of a clear liquid product, identified as N,N'-bis-1,2-ethylene (polypropylene glycol-1025) carbamate, are obtained, corresponding to a 98% yield. This product has a refractive index ($n_D^{25°}$) of 1.4550. Upon analysis, it is found to contain 2.38% nitrogen and 0.1% chlorine as compared to calculated values of 2.41% and 0.0% respectively.

Example E

A 500 ml. three necked flask was equipped with a stirrer, thermometer, condenser and dropping funnel. To the flask was added 75 ml. of water, 41.4 g. (0.3 M) $K_2CO_3$, and 9.0 g. of ethylenimine. The mixture was stirred and cooled to 10° C. and a solution of 43.1 g. (0.915 M) of the bis-chlorocarbonate of 1,1'-isopropylidenebis (p-phenyleneoxy) di-2-propanol in 250 ml. of benzene was added dropwise with stirring and cooling over a period of 45 minutes. The temperature was maintained at 10–12° C. during the addition and then was allowed to reach room temperature while stirring for an additional hour. The benzene layer was separated, dried over a molecular sieve, filtered and evaporated to constant weight under vacuum. 42.2 g. of an amber liquid product was obtained, corresponding to a 95% yield of N,N' - bis - ethylene[1,1' - isopropylidenebis (p - phenyleneoxy) di-2-propanol] carbamate. Product analysis was as follows: Calculated: N, 5.80; Cl, 0.0. Found: N, 5.45; Cl, 0.1.

Example F

To a 500 ml. three necked flask equipped with stirrer, thermometer, condenser, and dropping funnel was added 50 ml. of water, 25 g. (0.18 M) $K_2CO_3$ and 6.7 g. of ethylenimine. The mixture was stirred and cooled to 10° C. and a mixture of 51.5 g. (0.04 M) of the tris-chlorocarbonate of Dow "Polyglycol 15–100" in 200 ml. of benzene was added dropwise with stirring and cooling over a period of 80 minutes. Dow "Polyglycol 15–100" may be represented structurally as

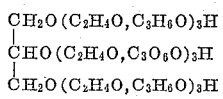

The temperature was maintained at 10–12° C. during the addition. The mixture was allowed to warm to room temperature while stirring for an additional hour. The benzene layer was separated, dried over a molecular sieve, filtered and evaporated to constant weight under vacuum. 50 g. of a water-white liquid product analyzing 3.38% N and 0.1% $Cl^-$ was obtained, corresponding to a 96% yield of N,N',N''-tris-1,2-ethylene (Dow Polyglycol 15–100) carbamate.

Example G

A 500 ml. three necked flask was equipped with a stirrer, thermometer, condenser and dropping funnel. To the flask was added 50 ml. of water, 12.4 g. (0.09 M) of $K_2CO_3$, and 2.7 g. of ethylenimine. The mixture was stirred and cooled to 10° C., and a solution of 55.7 g. (0.02 M) of the trichlorocarbonate of Dow "Polyglycol 15–200" in 200 ml. of benzene was added dropwise with stirring and cooling over a period of 75 minutes. Dow "Polyglycol 15–200" may be represented structurally as

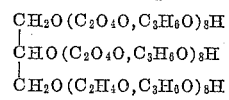

The temperature was maintained at 10–12° C. during the addition. The mixture was then allowed to warm to room temperature while stirring for an additional hour. The benzene layer was separated, dried over a molecular sieve, filtered, and evaporated to constant weight under vacuum. 53.1 g. of water-white liquid product analyzing 1.61% N and 0.08% $Cl^-$ was obtained, corresponding to a 95% yield of N,N',N''-tris-1,2-ethylene (Dow Polyglycol 15–200) carbamate.

Example H

A 1000 ml. three necked flask was equipped with a stirrer, thermometer, condenser, and dropping funnel. To the flask was added 300 ml. of water, 62 g. (0.45 M) $K_2CO_3$ and 16.4 g. of ethylenimine. The mixture was stirred and cooled to 0° C. and a solution of 39 g. (0.166 M) of resorcinol bis-chlorocarbonate in 150 ml. of chloroform was added dropwise with stirring and cooling over a period of 41 minutes. The temperature was maintained at 0–5° C. during the addition and thereafter allowed to reach room temperature during an additional two hours with stirring. The chloroform layer was separated, dried over a desiccant, filtered and evaporated to constant weight under vacuum. 37 g. of an amber liquid product was obtained, corresponding to 90% yield of N,N'-bis-1,2-ethylene resorcinol carbamate.

It will be apparent that the poly-1,2-alkylene carbamates employed herein are prepared by selecting the appropriate 1,2-alkylenimine and chlorocarbonate, which are condensed by the procedures set forth above. In this way, the following compounds, which are further illustrative of the poly-1,2-alkylene carbamates of this invention, were prepared, having the noted properties:

| Compound | Appearance |
| --- | --- |
| N,N'-bis-1,2-ethylene (diethylene glycol) carbamate. | White solid M.P. 36–37.5° C. |
| N,N'-bis-1,2-ethylene (polyethylene glycol-400) carbamate. | Water-white liquid. |
| N,N'-bis-1,2-ethylene (polyethylene glycol-4000) carbamate. | White waxy solid M.P. 53–56° C. |
| N,N'-bis-1,2-ethylene (polybutylene glycol-500) carbamate. | Water-white liquid. |
| N,N'-bis-1,2-propylene (triethylene glycol) carbamate. | Do. |
| N,N'-bis-1,2-butylene (triethylene glycol) carbamate. | Do. |
| N,N'-bis-1,2-propylene (polyethylene glycol-1000) carbamate. | White waxy solid M.P. 37–40° C. |
| N,N'-bis-1,2-butylene (diethylene glycol) carbamate. | Water white liquid. |
| N,N'-bis-1,2-ethylene [1,1'-isopropylidenebis (p-cyclohexanol)] carbamate. | Slightly yellow liquid. |

In the same manner other poly-1,2-alkylene carbamates may be prepared for use in preparing the polymers of this invention.

III. THE COPOLYMERS OF THE INVENTION

Example 1

About 95 parts of ethylene diamine were stirred into 100 parts of liquid N,N'-bis-1,2-ethylene (polybutylene glycol-500) carbamate (2:1 equivalent ratio) at room temperature and the resulting solution was cured for 24 hours at 65° C., 5 hours at 121° C. and 3 hours at 177° C. The resulting rubber was found to be very flexible and slightly tacky.

Example 2

About 21 parts of triethylene tetramine and 100 parts of N,N'-bis-1,2-ethylene (1,4-butane diol) carbamate (1:1 equivalent ratio) were mixed at room temperature, both constituents being liquids. This mixture was found to cure in less than 20 hours at room temperature to a clear, transparent, inflexible resin. Alternately it may be cured in less than 1 minutes at 177° C., although some foaming did take place in this high temperature cure.

In order to evaluate its physical characteristics, additional amounts of the liquid mixture were poured into suitable molds and cured for approximately 2 weeks at about 25° C. The following data were obtained from tests run on this material:

Tensile strength (p.s.i.) (ASTM D638-56T) _____ 10,950
Modulus in tension (p.s.i.) (ASTM D638-56T) _____ $1.49 \times 10^5$
Hardness, Shore A–2 (ASTM D676–55T)____ 90–92

A sample of this resin was aged for 24 hours at 177° C. in order to evaluate the effect of high temperatures upon the resin. At the end of this time the sample was found to be somewhat darkened but otherwise apparently unaffected.

Example 3

About 16.7 parts of triethylene tetramine and 100 parts of N,N'-bis-1,2-ethylene (triethylene glycol) carbamate (1:1 equivalent ratio) were mixed at room temperature, both constituents being liquids. This mixture was found to cure in less than 20 hours at room temperature to a slightly yellowish but transparent and flexible resin. Alternatively it cured in less than 1 minute at 177° C. to a yellowish brown resin, with some foaming taking place during the high temperature cure.

In order to evaluate its physical characteristics, additional amounts of this liquid mixture were poured into suitable molds and cured for approximately 2 weeks at room temperature. The following data were obtained from tests run on this material:

Tensile strength (p.s.i.) ------------------------ 1,830
Elongation (percent) (ASTM D638-56T) ---- 35
Modulus in tension (p.s.i.) ------------------ $1.90 \times 10^4$
Hardness, Shore A-2 ----------------------- 90–96

A sample of this copolymer was aged for 24 hours at 177° C. in order to evaluate the effect of high temperature upon the resin. At the end of this heat cycle the sample was found to be somewhat discolored but otherwise apparently unaffected.

Example 4

Approximately 14.2 parts of triethylene tetramine and 100 parts of N,N'-bis-1,2-ethylene (polyethylene glycol-200) carbamate (1:1 equivalent ratio) were mixed at room temperature, both constituents being liquids. This mixture was found to cure in less than 20 hours at room temperature to a transparent, somewhat flexible resinous material. Alternatively it was found to cure in less than 1 minute at 177° C. to a partially foamed yellow colored resin.

In order to evaluate its physical characteristics, additional amounts of the same liquid mixture were poured into suitable molds and cured for approximately 2 weeks at room temperature. The following data were obtained from tests run on this material:

Tensile strength (p.s.i.) ------------------------ 2,950
Elongation (percent) --------------------------- 8
Modulus in tension (p.s.i.) -------------------- 1,565
Hardness, Shore A-2 --------------------------- 75–85

A sample of this copolymer was heat aged for 24 hours at 177° C. in order to evaluate its resistance to high temperature. At the end of this heat cycle the sample was found to be somewhat darkened in color and slightly less flexible but otherwise apparently unaffected.

Example 5

About 8.9 parts of triethylene tetramine and 100 parts of N,N'-bis-1,2-ethylene (polyethylene glycol-400) carbamate (1:1 equivalent ratio) were mixed at room temperature, both constituents being liquids. The liquid mixture was poured into molds and cured for approximately 2 weeks at room temperature. The resulting transparent, clear, flexible resin was subjected to physical tests, the following data being obtained:

Tensile strength (p.s.i.) ------------------------ 70
Elongation (percent) --------------------------- 8
Modulus in tension (p.s.i.) --------------------- 786
Hardness, Shore A-2 --------------------------- 80

A sample of this copolymer was aged for 24 hours at 177° C. in order to evaluate its resistance to heat. At the end of this heat cycle the sample was found to have discolored and to have softened slightly.

Example 6

About 4.1 parts of triethylene tetramine and 100 parts of N,N'-bis-1,2-ethylene (polypropylene glycol-1025) carbamate (1:1 equivalent ratio) were mixed at room temperature, both constituents being liquids. The resulting liquid mixture was poured into suitable molds and cured for ½ hour at 150° C. The following data were obtained from tests run on the resulting transparent, flexible, yellowish brown colored resin:

Tensile strength (p.s.i.) ------------------------ 27
Elongation (percent) --------------------------- 15
Modulus in tension (p.s.i.) --------------------- 116

Example 7

About 7.5 parts of triethylene tetramine and 100 parts of N,N'-bis-1,2-ethylene (polybutylene glycol-500) carbamate (1:1 equivalent ratio) were mixed at room temperature, both constituents being liquids. The resulting liquid was poured into molds and cured for 10 minutes at 177° C. to form a transparent, flexible, slightly yellowish resin. The following data were obtained from tests run on this material:

Tensile strength (p.s.i.) ------------------------ 29
Elongation (percent) --------------------------- 3
Hardness, Shore A-2 --------------------------- 53

Example 8

About 10 parts of triethylene tetramine and 100 parts of N,N'-bis-1,2-ethylene [1,1'-isopropylidenebis (p-phenyleneoxy) di-2-propanol] carbamate (1:1 equivalent ratio) were mixed at room temperature, both constituents being liquids. The mixture cured in less than 20 hours at 25° C. to a relatively rigid, translucent polymer having excellent film-forming characteristics. Alternately the liquid mixture cured in less than 2 minutes at 177° C. to form a solid resin of similar characteristics.

In order to evaluate certain of its physical and electrical characteristics, additional amounts of the liquid mixtures were poured into molds and cured. The following data were obtained from tests run on this material, the only distinction between Lots A and B being the respective cure cycles.

| | Lots | |
| --- | --- | --- |
| | A | B |
| Cure Cycle | 2 weeks at 25° C | 1 hr. at 121° C. 1 hr. at 177° C. |
| Tensile Strength (p.s.i.) | 4,820 | 8,070. |
| Elongation (percent) | 8 | 5. |
| Modulus in Tension (p.s.i.) | $7.8 \times 10^4$ | $2.47 \times 10^5$. |
| Hardness, Shore A-2 | 93–96 | |
| Hardness, Rockwell L (ASTM D 785-51) | | 90. |
| Water Absorption at 25° C. (ASTM D 570): | | |
| 1 Day (Percent) | 0.773 | |
| 5 Days (Percent) | 1.80 | |

Samples of Lot B above are also subjected to electrical tests, the results being as follows:

Dissipation factor at 25° C. (ASTM D150-55T):
   60 cycles ------------------------------ .0145
   1000 cycles --------------------------- .00795
Dielectric constant at 25° C. (ASTM D150-54T):
   60 cycles ------------------------------ 3.95
   1000 cycles --------------------------- 3.91
Volume resistivity at 25° C. (ohm-cm.) (ASTM D257-54T) --------------------------- $4.8 \times 10^{12}$

Example 9

About 16.8 parts of solid hexamethylene diamine were dispersed in 100 parts of N,N'-bis-1,2-butylene (triethylene glycol) carbamate (1:1 equivalent ratio), the carbamate being a liquid at room temperature, and the mixture was warmed to dissolve the solid material. This material was found to cure tack free in ½ hour at 121° C.

In order to evaluate its physical characteristics, additional amounts of the same liquid mixture were poured into suitable molds and cured for 1¼ hours at 121° C.

The following data were obtained from tests run on this material:

| | |
|---|---|
| Tensile strength (p.s.i.) | 369 |
| Elongation (percent) | 80 |
| Modulus in tension (p.s.i.) | 738 |
| Hardness, Shore A-2 | 50–55 |

This solid resin, which is transparent and colorless, forms a strong and extremely flexible film.

A sample of this resin was aged for 24 hours at 177° C. in order to evaluate the effect of high temperature upon the resin. At the end of this time the resin was found to have become inflexible and dark red in color.

A second liquid mixture of the same components was prepared in the same manner but utilizing 25.3 parts of hexamethylene diamine and 100 parts of the N,N'-bis-1,2-butylene (triethylene glycol) carbamate (1.5:1 equivalent ratio). This mixture cured tack free in ¾ hour at 121° C. Samples prepared to be used in physical and electrical tests were cured for 2½ hours at 121° C. The tests results were as follows:

| | |
|---|---|
| Tensile strength (p.s.i.) | 1280 |
| Elongation (percent) | 120 |
| Modulus in tension (p.s.i.) | 563 |
| Hardness, Shore A-2 | 80–85 |
| Water absorption at 25° C.: | |
| 1 day, percent | 7.45 |
| 5 days, percent | 11.2 |
| Dissipation factor at 25° C.: | |
| 60 cycles | .0985 |
| 1000 cycles | .0495 |
| Dielectric constant at 25° C.: | |
| 60 cycles | 6.20 |
| 1000 cycles | 5.33 |
| Volume resistivity at 25° C. (ohm-cm.) | $1.8 \times 10^{12}$ |
| Dielectric strength (ASTM D149–55T) (volts per mil) | >560 |

This copolymer, cured as above, formed clear, colorless, flexible films of excellent strength which adhered well to common materials of construction such as, for example, to aluminum and for these reasons forms excellent protective coatings. It is also useful as an encapsulating resin for electrical components and circuits.

*Example 10*

About 72 parts of "Versamid" XD 140 polyfunctional amine were heated to approximately 120° C. in order to lower the viscosity thereof and 100 parts of powdered N,N'-bis-1,2-ethylene [1,1'-isopropylidenebis (p-cyclohexanol)] carbamate (1:1.2 equivalent ratio) were added with stirring. The mixture was poured into molds and cured for approximately 3 minutes at 171° C. The resulting yellowish white colored and comparatively rigid resin was subjected to physical tests, the following data being obtained:

| | |
|---|---|
| Hardness, Rockwell L | 74 |
| Heat penetration temperature, ° C.[1] | 51 |

[1] The heat penetration temperature is determined as follows: The resin sample is immersed in a silicone oil bath. A 1 kg. load is applied to the sample through a 1 square millimeter bearing surface. The oil is heated at the rate of 2° C. per minute and the temperature at which the bearing surface begins to penetrate the sample is reported.

A sample of this copolymer was aged for 24 hours at 177° C. in order to evaluate its resistance to heat. At the end of this heat cycle the sample was found to have darkened slightly but was apparently otherwise unaffected.

In another mixture of the same constituents, 100 parts of the solid powdered bis-carbamate were dispersed in 78.3 parts of the polyfunctional amine at 25° C. (an equivalent ratio of the amine to the carbamate of 1.1:1). The liquid dispersion was poured into molds and cured for approximately 5 minutes at 150° C. The resulting transparent, yellow-colored, slightly flexible resin was subjected to physical tests, the following data being obtained:

| | |
|---|---|
| Hardness, Shore A-2 | >95 |
| Heat penetration point, ° C. | 45 |

A sample of this copolymer was aged for 24 hours at 177° C. in order to evaluate its resistance to heat. At the end of this time, the sample was found to have darkened in color and to have become somewhat more rigid.

*Example 11*

Three copolymers of varying proportions of N,N'-bis-1,2-ethylene (1,4-butanediol) carbamate and "Versamid" 125 polyfunctional amine were prepared and evaluated as indicated in the following table, heating being required in all cases to obtain compatibility of the liquid constituents:

| | Lots | | |
|---|---|---|---|
| | A | B | C |
| Composition (parts by weight): | | | |
| N,N'-bis-1,2-ethylene (1,4-butanediol) carbamate. | 100 | 100 | 100. |
| "Versamid" 125 polyfunctional amine. | 92 | 138 | 207. |
| Equivalent Ratio (carbamate/amine). | 1.5:1 | 1:1 | 1:1.5. |
| Cure: | | | |
| 25° C | 3 days [1] | | |
| 150° C | | 1 hr | 1 hr. |
| Flexibility | Relatively rigid. | Flexible | Flexible. |
| Hardness, Shore A-2 | 94 | 60–65 | 40–50. |
| Water Absorption at 25° C.: | | | |
| 1 Day (Percent) | 3.35 | | |
| 5 Days (Percent) | 6.36 | | |

[1] Preheated for 3 minutes at about 70° C. to obtain solution.

All of the preceding lots cured to form clear, yellow resins with good film-forming characteristics. Lots B and C form particularly tough films which have high impact resistance and adhere well to aluminum. Portions of Lot B were also cured in less than 3 minutes at 177° C. to a partially foamed resin and in less than 20 hours at 25° C. to a translucent, yellow colored, slightly flexible resin.

In order to evaluate certain of its physical, electrical and chemical resistance properties, additional amounts of the liquid mixture of Lot A above were poured into molds and cured for 1 hour at 150° C. and 1 hour at 177° C. The following data were obtained from tests run on this material:

| | |
|---|---|
| Tensile strength (p.s.i.) | 1620 |
| Elongation (percent) | 80 |
| Modulus in tension (p.s.i.) | 8240 |
| Hardness, Shore A-2 | 60–65 |
| Dissipation factor at 25° C.: | |
| 60 cycles | .0815 |
| 1000 cycles | .0472 |
| Dielectric constant at 25° C.: | |
| 60 cycles | 4.8 |
| 1000 cycles | 4.27 |
| Volume resistivity at 25° C. (ohm-cm.) | $2.1 \times 10^{12}$ |
| Chemical resistance: [1] | |
| Ethyl Acetate— | |
| Weight increase, percent | 18.7 |
| Weight extracted, percent | 2.49 |
| Benzene— | |
| Weight increase, percent | 24.0 |
| Weight extracted, percent | 2.46 |
| Carbon tetrachloride— | |
| Weight increase, percent | 49.3 |
| Weight extracted, percent | 6.9 (gain) |

[1] The samples (which are 2 inch diameter plates of the order of .06 inch in thickness) were dried for 1 hour at 121° C. before making the initial weighing. They were weighed and then immersed for 7 days in 110 cc. of the indicated solvent at approximately 25° C. and were then weighed to obtain the weight increase. Finally the samples were dried at 160° C. to constant weight to obtain the weight extracted figure. The percent of weight increase and of weight extracted as reported are based on the original weight as 100%

Example 12

About 128 parts of "Versamid" 125 polyfunctional amine and 100 parts of N,N'-bis-1,2-ethylene (triethylene glycol) carbamate (1:1 equivalent ratio) were mixed with some heating to achieve compatibility of the liquid constituents. This mixture was found to cure in less than 3 minutes at 177° C. or in slightly more than 20 hours at 25° C. to a transparent, yellow colored rubber.

Example 13

About 109 parts of "Versamid" 125 polyfunctional amine and 100 parts of N,N'-bis-1,2-ethylene (polyethylene glycol-200) carbamate (1:1 equivalent ratio) were mixed by the procedure of Example 12. This mixture was found to cure in less than 3 minutes at 177° C. to a transparent, yellow colored resin.

Example 14

A 1:1 equivalent weight ratio of "Versamid" 125 polyfunctional amine and N,N'-bis-1,2-ethylene [1,1'-isopropylidenebis (p-phenyleneoxy) di-2-propanol] carbamate was mixed by the procedure of Example 12. The resulting copolymer cured in less than 1 minute at 177° C. to a yellowish brown colored translucent, slightly flexible resin. Alternately it may be cured in less than 20 hours at 25° C.

Example 15

About 100 parts of "Emery 3154–R" amine and 100 parts of N,N'-bis-1,2-propylene (triethylene glycol) carbamate (1:1 equivalent ratio) were mixed by the procedure of Example 12. The liquid mixture was poured into molds and cured for approximately 8 minutes at 132° C. and 51 minutes at 171° C. to form a transparent, brown colored flexible resin. The hardness (Shore A–2) of this material is 45–55.

A sample of this copolymer was aged for 24 hours at 177° C. in order to evaluate its resistance to heat. At the end of this heat cycle the sample was found to have become relatively hard and to have darkened considerably.

In order to evaluate certain of its physical and electrical characteristics as well as its resistance to various solvents, additional amounts of the liquid mixture were poured into molds and cured for 40 minutes at 115° C. and 1 hour at 177° C. The following data were obtained from tests run on this material:

Tensile strength (p.s.i.) _____ 131.5
Elongation (percent) _____ 95
Modulus in tension (p.s.i.) _____ 209
Scott brittleness, $T_B$, ° C. (ASTM D746–57T)___ −45
Hardness, Shore A–2 _____ 50–55
Electrical properties:
   Dissipation factor (25° C.)—
      60 cycles _____ .111
      1000 cycles _____ .122
   Dielectric constant (25° C.)—
      60 cycles _____ 7.03
      1000 cycles _____ 5.74
   Volume resistivity at 25° C. (ohm-cm.) __ $5.8 \times 10^{11}$
Chemical resistance (7 days):
   Ethyl acetate—
      Weight increase (percent) _____ 18.9
      Weight extracted (percent) _____ 15.9
   Benzene—
      Weight increase (percent) _____ 9.31
      Weight extracted (percent) _____ 17.4
   Carbon tetrachloride—
      Weight increase (percent) _____ 98.6
      Weight extracted (percent) _____ 15.2
Water absorption [1]
   1 day (percent) _____ 1.84
   5 days (percent) _____ 3.48

[1] Water absorption samples cured 8 minutes at 132° C. and 1 hour at 171° C.

Example 16

In order to compare their respective resistance to weathering or soaking, a copolymer according to the present case and an amine-cured epoxy resin are prepared and tested as follows:

A 1:1 equivalent weight ratio of metaxylylene diamine and N,N'-bis-1,2-ethylene (1,4-butane diol) carbamate was mixed at room temperature and heated to achieve compatibility, both constituents being liquids.

A second lot of resin was prepared by mixing a liquid condensation polymer of epichlorohydrin and bisphenol-A having an epoxide equivalent of 173–179, a viscosity at 25° C. in the range of from 3,600–6,400 centipoises, an average molecular weight of 340–350 (available commercially under the trade designation "DER 332" from the Dow Chemical Company) with metaxylylene diamine. A 1:1 equivalent weight ratio of metaxylylene diamine and the epoxy resin was mixed at room temperature and heated to achieve compatibility.

These two resin systems were applied to $\frac{1}{16}$–$\frac{1}{8}$ inch thick clear, transparent polymethylmethacrylate test panels to a thickness of 10–30 mils and were then cured, the bis-carbamate resin for 30 minutes at 104° C. and the epoxy resin lot for 30 minutes at 90° C. After the respective cure cycles both systems were of good clarity and had excellent adhesion to the test panels.

Test panels from each of these two lots were immersed in water at 50° C. for 30 days, a second set of test panels from each lot were immersed in 0.9% aqueous sodium chloride for 30 days at 50° C. and a third set of test panels from boths lot were immersed in 0.01 N hydrochloric acid also for 30 days at 50° C.

At the end of the test period, the six lots of test panels were examnied. All of the epoxy resin coatings were found to be extensively damaged. The resin coating pulled away from the test panels and badly discolored in the sodium chloride solution soaked panels and were badly discolored and no longer clear in the case of the other two lots. The bis-carbamate resin treated panels, on the other hand, were essentially unaffected by any of these tests. In all cases the resin remained clear and maintained excellent adhesion to the test panels and appeared to have only a slight brownish tinge.

Example 17

About 22.7 parts of metaxylylene diamine and 100 parts of N,N'-bis-1,2-butylene (diethylene glycol) carbamate (1:1 equivalent ratio) were mixed at room temperature and heated to achieve compatibility, both constituents being liquids. The liquid mixture was poured into molds and was cured for 90 minutes at approximately 105 to 120° C.

The resulting yellowish colored transparent resin exhibited excellent film characteristics and reasonably good adhesion to aluminum. Its hardness, Shore A–2, was greater than 95, and upon heat aging for 24 hours at 177° C. it darkened to a brown color and became relatively rigid.

In order to evaluate certain of its physical and electrical characteristics as well as its resistance to various solvents, additional amounts of the same liquid mixture were poured into suitable molds and cured for 1 hour at 121° C. and 1 hour at 177° C. The following data were obtained from tests run on this material:

Tensile strength (p.s.i.) _____ 7450
Elongation (percent) _____ 6
Modulus in tension (p.s.i.) _____ 131,000
Hardness, Rockwell L _____ 70
Electrical properties:
   Dissipation factor at 25° C.—
      60 cycles _____ .00858
      1000 cycles _____ .00678
   Dielectric constant at 25° C.—
      60 cycles _____ 3.57
      1000 cycles _____ 3.53

Electrical properties—Continued
Volume resistivity at 25° C. (ohm-cm.) __ 1×10¹³
Chemical resistance (7 days):
   Benzene—
      Weight increase (percent) _____ 28.1
      Weight extracted (percent) _____ 4.9
   Carbon tetrachloride—
      Weight increase (percent) _____ 3.75
      Weight extracted (percent) _____ 1.21
Water absorption at 25° C.:[1]
   1 day (percent) _____ 2.48
   5 days (percent) _____ 5.45

[1] Water absorption samples cured for 1½ hours at 116° C.

Example 18

About 32 parts of benzidine, a solid melting at 127° C., were added to 100 parts of N,N'-bis-1,2-ethylene (triethylene glycol) carbamate (1:1 equivalent ratio) and the mixture was heated to dissolve the benzidine and form a compatible solution. The resulting solution, which will gel in from 5 to 8 minutes at 121° C., was cured for 2 hours at 150° C. to form a clear, dark red, relatively rigid resin. The film characteristics of this material were excellent. It was extremely strong and tough and had high impact resistance and possessed utility as a plastic tooling resin. The hardness of the resin (Rockwell R) was 110. After undergoing an additional heat aging cycle of 24 hours at 177° C. the hardness of this resin was increased to 120 (Rockwell R) although the resin was apparently otherwise unaffected.

In order to evaluate certain of its physical and electrical characteristics as well as its resistance to solvents, additional amounts of the liquid material were poured into molds and cured for 1½ hours at 150° C. and 1 hour at 177° C. The following data were obtained from tests run on this material:

Tensile strength (p.s.i.) _____ 8830
Elongation (percent) _____ 12
Modulus in tension (p.s.i.) _____ 154,500
Hardness, Rockwell R _____ 110
Electrical properties:
   Dissipation factor at 25° C.—
      60 cycles _____ .0061
      1000 cycles _____ .00597
   Dielectric constant at 25° C.—
      60 cycles _____ 4.72
      1000 cycles _____ 4.67
   Volume resistivity at 25° C. (ohm-cm.) __ 6.3×10¹²
Chemical resistance (7 days):
   Ethyl acetate—
      Weight increase (percent) _____ .29
      Weight extracted (percent) _____ 0.36
   Benzene—
      Weight increase (percent) _____ .72
      Weight extracted (percent) _____ 0.23
   Carbon tetrachloride—
      Weight increase (percent)_____ .56
      Weight extracted (percent) _____ 0.19
Water absorption at 25° C.:[1]
   1 day (percent) _____ 4.37
   5 days (percent) _____ 9.62

[1] Water absorption samples cured for 2 hours at 150° C.

Example 19

About 33 parts of diamino diphenylsulfone and 100 parts of N,N'-bis-1,2-ethylene [1,1'-isopropylidenebis (p-cyclohexanol)] carbamate (1:1 equivalent ratio) were mixed as solids then heated with stirring until a homogenous solution was obtained. The mixture cured in 5 minutes at 177° C. to a rigid, opaque and black resin which had a heat penetration temperature of 135–140° C. This resin was apparently unaffected by an additional heat aging cycle of 24 hours at 177° C.

Example 20

About 43 parts of N-(2-aminoethyl)piperazine and 100 parts of N,N'-bis-1,2-ethylene (1,4-butanediol) carbamate (1:1 equivalent ratio) were mixed at room temperature, both constituents being liquids, and the mixture was coated onto wood panels. After curing in the range of 90–150° C. a tough, hard, clear and durable surface coating was formed on the wood which was particularly valuable in protecting the coated wood from being defaced, soiled or scratched. Alternatively the liquid mixture may be partially reacted to form a liquid B-stage resin which can also then be used to coat wood panels.

Example 21

About 2.1 parts of N-(2-aminoethyl)piperazine (a liquid at room temperature) were mixed thoroughly with 100 parts of previously melted N,N'-bis-1,2-ethylene (polyethylene glycol-4000) carbamate (1:1 equivalent ratio). Portions of the liquid mixture were coated while still warm onto wooden panels and cured to form a smooth, tightly adherent coating which emphasizes and beautifies the grain of the coated wood. This copolymer could be cured to form a dark reddish-brown colored, somewhat waxy casting.

In another preparation the same bis-carbamate and polyfunctional amine were mixed in the proportions previously indicated and a catalytic amount (i.e., up to about 5 parts per 100 parts of resin) of the coordination complex of boron trifluoride with mono ethyl amine (available commercially from the Shell Chemical Company under the trade designation "BF3–400") were dissolved in the warm, somewhat super cooled liquid resin. The resulting mixture was heated in the range of from about 70° to 140° C. for from about 5 to 10 minutes until a noticeable increase in viscosity took place and then more slowly until copolymerization had advanced to the point where the resin became solid. When cooled it was found to be an opaque, exceptionally strong and tough copolymer with some elasticity. Its strength and toughness were demonstrated by striking a small casting of the resin several times with a hammer without disrupting its structure.

Portions of the same catalyzed copolymeric resin were coated while in liquid form on panels of wood and glass. It was found to adhere very well to glass as it did to the wooden test panels. The coating on the wooden test panels was of particular interest, being smooth and somewhat waxy to the touch and having the property of emphasizing and enhancing the grain of the wood.

Example 22

About 37 parts of n-butyl amine and 100 parts of N,N'-bis-1,2-ethylene (1,4-butanediol) carbamate (1:1 equivalent ratio) were mixed at room temperature, both constituents being liquids, and the mixture was coated onto wooden panels. The liquid resin penetrated deeply into and filled the grain of the wood to produce a flat surface. After penetration and leveling it was capable of curing at temperatures in the region of 90–150° C. depending upon the velocity of cure desired. When cured the resin formed a clear, durable and glossy protective and decorative coating on the wood which emphasized and enhanced the grain thereof.

Alternately, the liquid mixture can be partially reacted to form a still liquid B-stage resin which can also be used to coat wooden panels with similar results and which may in some instances, because of its viscosity, the relatively shorter additional cure required, etc., be preferred to the unreacted mixture of the comonomers.

Similar liquid mixtures of the same constituents can be poured into molds and cured to form clear, tough, castings with little shrinkage during the curing cycle.

Example 23

About 26 parts of n-butyl amine and 100 parts of N,N'-bis-1,2-ethylene (triethylene glycol) carbamate (1:1 equivalent ratio) were mixed at room temperature, both constituents being liquids. The resulting liquid was poured into molds and cured for 5 hours at 121° C., 2 hours at 150° C. and 4 hours at 177° C. The resulting transparent, brown colored flexible resin had a hardness, Shore A–2, of 15–20. When subjected to an additional cure cycle of 24 hours at 177° C. the resin darkened somewhat in color and also hardened slightly.

Example 24

About 1.8 parts of n-butyl amine were mixed thoroughly with 100 parts of previously melted N,N'-bis-1,2-ethylene (polyethylene glycol-4000) carbamate (1:1 equivalent ratio) and the resulting mixture was poured while still warm into molds and was cured at a temperature of about 120–170° C. to a translucent yellowish colored, waxy resin.

Example 25

About 46.5 parts of aniline and 100 parts of N,N'-bis-1,2-ethylene (1,4-butanediol) carbamate (1:1 equivalent ratio) were mixed at room temperature, both constituents being liquids, and the mixture was coated onto wooden panels. After curing at a temperature between about 120–170° C. the resin had cured to form a clear, hard, durable coating for the wood which is particularly valuable for protecting soft woods from being defaced, soiled or scratched. When the same mixture was coated onto a coarse paper, producing a transparent paper of good crease resistance and good tear strength. Alternately, the materials react smoothly at room temperature (with slight exotherm) to form a liquid B-stage resin which can also be used to coat the wooden panels.

Example 26

About 41 parts of aniline and 100 parts of N,N'-bis-1,2-ethylene (1,4-butanediol) carbamate were mixed at room temperature, both constituents being liquids. The mixture cured in 22 minutes at 105–120° C. and 60 minutes at 120–132° C. to a clear, transparent, slightly flexible resin which had excellent film-forming properties and which adhered reasonably well to aluminum. A sample of this resin was aged for 24 hours at 177° C. in order to evaluate the effect of high temperature upon the resin. At the end of this time the resin was found to have become somewhat more rigid and brownish in color.

In order to evaluate certain of its physical and electrical characteristics, additional amounts of the liquid mixture were poured into molds and cured for 40 minutes at 115° C. and 1 hour at 177° C. The following data were obtained from tests run on this material:

| | |
|---|---:|
| Tensile strength (p.s.i.) | 9,300 |
| Elongation (percent) | 11 |
| Modulus in tension (p.s.i.) | 155,000 |
| Hardness, Rockwell L | 70 |
| Hardness, Shore A–2 | >95 |
| Electrical properties: | |
| Dissipation factor at 25° C.— | |
| 60 cycles | .00965 |
| 1000 cycles | .00796 |
| Dielectric constant at 25° C.— | |
| 60 cycles | 3.79 |
| 1000 cycles | 3.73 |
| Volume resistivity at 25° C. (ohm-cm.) | $1.7 \times 10^{13}$ |
| Chemical resistance (7 days): | |
| Ethyl acetate— | |
| Weight increase (percent) | 1.49 |
| Weight extracted (percent) | 0.25 |
| Benzene— | |
| Weight increase (percent) | 1.44 |
| Weight extracted (percent) | 0.31 |
| Carbon tetrachloride— | |
| Weight increase (percent) | 1.01 |
| Weight extracted (percent) | 0.25 |
| Water absorption at 25° C.[1] | |
| 1 day (percent) | 0.776 |
| 5 days (percent) | 1.74 |

[1] Water absorption samples cured 20 minutes at 110° C. and 1 hour at 127° C.

Example 27

An equivalent weight ratio of n-methyl cyclohexyl amine and N,N'-bis-1,2-ethylene (1,4-butanediol) carbamate were mixed at room temperature, and the resulting mixture was cured at 250° F. to 350° F. for ½ to 3 hours, depending on the results desired. This hard copolymer was useful as a paper saturant and a coating for wood. A tough, scratch resistant wood surface can also be prepared by impregnating a wood sample with the above reactants and subsequently curing.

Example 28

0.25 g. of m-phenylene diamine and 4.0 g. of N,N',N''-tris-1,2-ethylene (Dow Polyglycol 15–100) carbamate were mixed at room temperature, the m-phenylene diamine being first melted then added to the carbamate (1:1 equivalent weight ratio). After curing for 3 hours at 230° F. a very clear, brownish colored, very flexible material with a Shore A–2 hardness value between 55 and 60 was produced. The product darkened in color after heat aging for 24 hours at 350° F.

Example 29

0.23 g. of piperazine and 5 g. of N,N',N''-tris-1,2-ethylene (Dow Polyglycol 15–200) carbamate were admixed by melting the piperazine in the presence of the carbamate (1:1 equivalent weight ratio). After curing for 3½ hours at 230° F. and 3 hours at 350° F. a polymeric product was formed which was somewhat tacky, clear, yellow colored, and very flexible. During the cure a gel was formed after one-half hour, after which the viscosity increased at a more rapid rate.

Example 30

Ordinary cotton cloth was treated with a 1% to 3% benzene solution of 1.83 parts of the N,N'-bis-ethylene-carbamate of 1,1'-isopropylidene-bis-p-phenol and 1.57 parts by weight of Emery 654–27–R diamine. After drying at room temperature the treated cloth was heated for 10 minutes at 120° C. to cure the materials impregnated therein. As compared to an untreated portion of the same cloth the treated portion exhibited excellent water repellent properties without any appreciable change in either color or "hand."

Extremely tough, flexible transparent coatings were obtained from 30 weight percent benzene solutions of the above reactants on both aluminum and glass. After heating for about one-half hour at 120° C. the resultant copolymeric coatings possessed good adhesion to both of these substrates and, probably because of the highly cross-linked structure, are water and solvent resistant.

The terms and expressions which have been employed are used as terms of description and not necessarily as terms of limitation. It is not intended to exclude any equivalents of the features shown and described or portions thereof, since it is recognized that various modifications are possible within the scope of the invention claimed.

I claim:
1. A normally solid interpolymer of
    (1) a substantially liquid polyfunctional amine having at least two amine-attached hydrogen atoms, said polyfunctional amine being selected from the group consisting of aliphatic polyamines, aromatic polyamines, araliphatic polyamines, acyclic polyamines and amides of aliphatic fatty acids, and (2) a compound of the formula

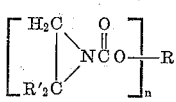

wherein R' is a member of the group consisting of hydrogen and a lower alkyl radical, $n$ is an integer from 2 to 3, and R is a $n$-valent organic radical selected from the group consisting of aliphatic, aromatic and alicyclic radicals.

2. An interpolymer of claim 1 in which said compound (2) is a N,N'-bis-1,2-alkylene carbamate.

3. An interpolymer of claim 1 in which said compound (2) is a N,N',N''-tris-1,2-alkylene carbamate.

4. An interpolymer of claim 1 in which said compound (2) is N,N'-bis-1,2-ethylene (1,4-butanediol) carbamate.

5. An interpolymer of claim 1 in which said compound (2) is N,N'-bis-1,2-ethylene (diethylene glycol) carbamate.

6. An interpolymer of claim 1 in which said compound (2) is N,N'-bis-1,2-butylene (diethylene glycol) carbamate.

7. An interpolymer of claim 1 in which said compound is N,N'-bis-1,2-ethylene (triethylene glycol) carbamate.

8. An interpolymer of claim 1 in which said compound (2) is N,N'-bis-1,2-butylene (triethylene glycol) carbamate.

9. An interpolymer of claim 1 in which said compound (2) is N,N'-bis-1,2-propylene (triethylene glycol) carbamate.

10. An interpolymer of claim 1 in which said compound (2) is N,N'-bis-1,2-ethylene (polyethylene glycol) carbamate.

11. An interpolymer of claim 1 in which said compound (2) is N,N'-bis-1,2-propylene (polyethylene glycol) carbamate.

12. An interpolymer of claim 1 in which said compound (2) is N,N'-bis-1,2-ethylene (polypropylene glycol) carbamate.

13. An interpolymer of claim 1 in which said compound (2) is N,N'-bis-1,2-ethylene (polybutylene glycol) carbamate.

14. An interpolymer of claim 1 in which said compound (2) is N,N'-bis-1,2-ethylene [1,1'-isopropylidenebis (p-cyclohexanol)] carbamate.

15. An interpolymer of claim 1 in which said compound (2) is N,N'-bis-1,2-ethylene [1,1'-isopropylidenebis (p-phenyleneoxy) di-2-propanol] carbamate.

References Cited in the file of this patent

UNITED STATES PATENTS

| | | |
|---|---|---|
| 2,655,494 | Kropa | Oct. 13, 1953 |
| 2,703,810 | Viard | Mar. 8, 1955 |
| 2,824,857 | Drechsel | Feb. 25, 1958 |
| 2,889,289 | Reeves et al. | June 2, 1959 |

FOREIGN PATENTS

| | | |
|---|---|---|
| 899,955 | France | June 15, 1945 |

UNITED STATES PATENT OFFICE
CERTIFICATE OF CORRECTION

Patent No. 3,162,617                      December 22, 1964

George H. Smith

It is hereby certified that error appears in the above numbered patent requiring correction and that the said Letters Patent should read as corrected below.

Column 3, line 62, for "particularly" read -- particularit --; column 6, line 8, for "propylene" read -- polypropylene --; column 9, lines 32 to 35, the second line of the formula should appear as shown below instead of as in the patent:

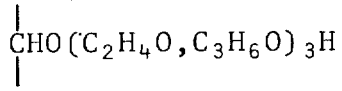

same column 9, lines 56 to 59, the first and second lines of the formula should appear as shown below instead of as in the patent:

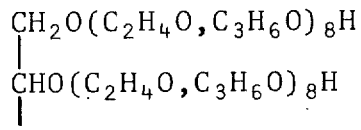

Signed and sealed this 13th day of July 1965.

(SEAL)
Attest:

ERNEST W. SWIDER                      EDWARD J. BRENNER
Attesting Officer                   Commissioner of Patents